(12) United States Patent
Pruyn

(10) Patent No.: US 7,212,325 B2
(45) Date of Patent: May 1, 2007

(54) MIRROR MOUNTING STRUCTURES AND METHODS FOR SCANNERS EMPLOYING LIMITED ROTATION MOTORS

(75) Inventor: Kristopher Pruyn, Tyngsborough, MA (US)

(73) Assignee: GSI Group Corporation, Billerica, MA (US)

( * ) Notice: Subject to any disclaimer, the term of this patent is extended or adjusted under 35 U.S.C. 154(b) by 0 days.

(21) Appl. No.: 10/996,524

(22) Filed: Nov. 23, 2004

(65) Prior Publication Data

US 2005/0111122 A1    May 26, 2005

Related U.S. Application Data

(60) Provisional application No. 60/524,683, filed on Nov. 24, 2003.

(51) Int. Cl.
*G02B 26/08* (2006.01)
*G02B 7/182* (2006.01)

(52) U.S. Cl. ........................ 359/198; 359/881
(58) Field of Classification Search ................ 359/881, 359/198, 199, 200, 212, 213, 214, 871, 872, 359/877

See application file for complete search history.

(56) References Cited

U.S. PATENT DOCUMENTS

| | | | | |
|---|---|---|---|---|
| 2,874,353 A | * | 2/1959 | Travis | .......................... 324/97 |
| 4,802,752 A | | 2/1989 | Anglin et al. | |
| 4,989,965 A | * | 2/1991 | Bryan | ......................... 359/872 |
| 5,383,544 A | * | 1/1995 | Patel | ....................... 192/70.28 |
| 5,424,632 A | | 6/1995 | Montagu | |
| 5,936,324 A | * | 8/1999 | Montagu | ............... 310/156.11 |
| 6,014,399 A | * | 1/2000 | Tanijiri et al. | ................. 372/92 |
| 6,275,319 B1 | | 8/2001 | Gadhok | |

FOREIGN PATENT DOCUMENTS

GB     1488056     10/1977

* cited by examiner

*Primary Examiner*—Alessandro Amari
(74) *Attorney, Agent, or Firm*—Gauthier & Connors, LLP

(57) ABSTRACT

A mirror mounting unit is disclosed for use in a limited rotation motor system. The mirror mounting unit includes a mirror, and a tapered base for coupling the mirror mounting unit to an output shaft of a limited rotation motor. In various embodiments, the tapered base may be male or female, the mirror may be formed integral with the tapered base, and the taper may be linear or non-linear.

33 Claims, 5 Drawing Sheets

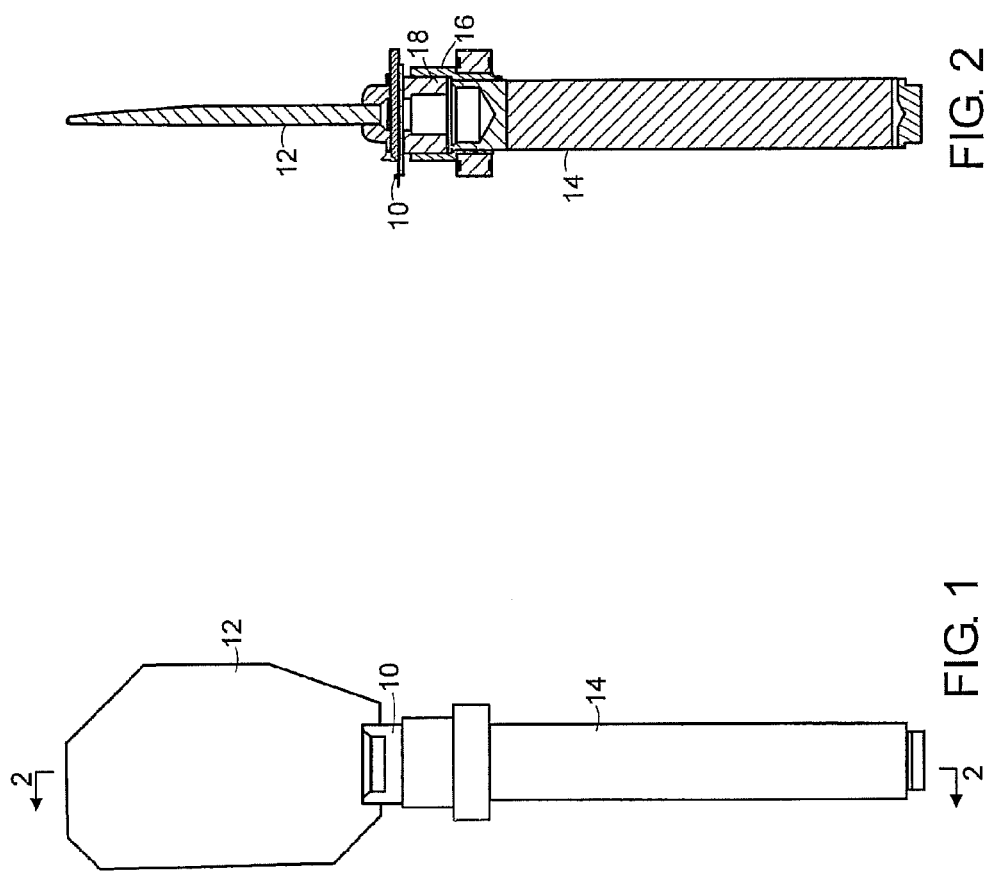

MIRROR MOUNTING STRUCTURES AND METHODS FOR SCANNERS EMPLOYING LIMITED ROTATION MOTORS

The present application claims priority to U.S. Provisional Patent Application Ser. No. 60/524,683 filed Nov. 24, 2003.

BACKGROUND

The invention relates to limited rotation motors such as galvanometers, and particularly relates to limited rotation motors used to drive optical elements such as mirrors for the purpose of guiding light beams in scanners.

Limited rotation motors generally include stepper motors and constant velocity motors. Certain stepper motors are well suited for applications requiring high speed and high duty cycle sawtooth scanning at large scan angles. For example, U.S. Pat. No. 6,275,319 discloses an optical scanning device for raster scanning applications.

Limited rotation motors for certain applications, however, require the rotor to move between two positions with a precise and constant velocity rather than by stepping and settling in a sawtooth fashion. Such applications require that the time needed to reach the constant velocity be as short as possible and that the amount of error in the achieved velocity be as small as possible. Constant velocity motors generally provide a higher torque constant and typically include a rotor and drive circuitry for causing the rotor to rotate about a central axis, as well as a position transducer, e.g., a tachometer or a position sensor, and a feedback circuit coupled to the transducer that permits the rotor to be driven by the drive circuitry responsive to an input signal and a feedback signal. For example, U.S. Pat. No. 5,424,632 discloses a conventional two-pole limited rotation motor.

A requirement of a desired limited rotation motor for certain applications is a system that is capable of changing the angular position of a load such as a mirror from angle A to angle B, with angles A and B both within the range of angular motion of the scanner, and both defined arbitrarily precisely, in an arbitrarily short time while maintaining a desired linearity of velocity within an arbitrarily small error. Both the minimum time of response of this system and the minimum velocity error are dominated by the effective bandwidth of the system. The bandwidth of the system is the concatenation of the servo amplifier bandwidth with that of the scanner.

For example, such limited rotation motors may be used in a variety of laser scanning applications, such as high speed surface metrology. Further laser processing applications include laser welding (for example high speed spot welding), surface treatment, cutting, drilling, marking, trimming, laser repair, rapid prototyping, forming microstructures, or forming dense arrays of nanostructures on various materials.

The processing speeds of such systems are typically limited by one of more of mirror speed, X-Y stage speed, material interaction and material thermal time constants, the layout of target material and regions to be processed, and software performance. Generally, in applications where one or more mirror speed, position accuracy, and settling time are factors which limit performance, any significant improvement in scanning system bandwidth may translate into immediate throughput improvements.

There is a need, therefore, for an improved limited rotation motor system, and more particularly, there is a need for a rotor for a limited rotation motor that provides improved bandwidth.

SUMMARY

The invention provides a mirror mounting unit for use in a limited rotation motor system. The mirror mounting unit includes a mirror, and a tapered base for coupling the mirror mounting unit to an output shaft of a limited rotation motor. In various embodiments, the tapered base may be male or female, the mirror may be formed integral with the tapered base, and the taper may be either linear or non-linear.

BRIEF DESCRIPTION OF THE DRAWINGS

The following description may be further understood with reference to the accompanying drawings in which:

FIG. 1 shows an illustrative diagrammatic view of a mirror and rotor assembly for a limited rotation motor system in accordance with an embodiment of the invention;

FIG. 2 shows an illustrative diagrammatic side sectional view of the mirror and rotor assembly shown in FIG. 1 taken along line 2—2 thereof;

The drawings are shown for illustrative purposes only.

DETAILED DESCRIPTION OF THE ILLUSTRATED EMBODIMENTS

Optical scanning applications typically require that a mirror be attached to a shaft of a motor either directly or indirectly. For example, clamp-like parts have been employed that function to support the mirror as well as to attach it to the shaft. In-separable cradle-and-clamp designs that are built into or onto the mirror have also been employed. Sometimes the mirror is simply cemented into a transverse slot in the shaft.

Applicant has discovered that providing an improved mirror mounting structure may provide limited rotation motor systems with improved bandwidth. In the general case, it is desirable that the mirror be attached in a way that permits easy assembly and/or removal. This is necessary to ease system assembly and alignment, and also to accommodate replacement of the mirror with one of a different size or reflectivity range, or to allow replacement of a damaged mirror in situ. Of course, it is also the function of the mounting means to assure geometrical alignment of the mirror as mounted to the shaft, at least in the direction normal to the mirror surface. Lastly, it is of great consequence that the inertia of the mount itself not compromise the performance of the system in dynamic applications, and be robust in proportion to the shock and vibration environment of static systems.

Figure 5:
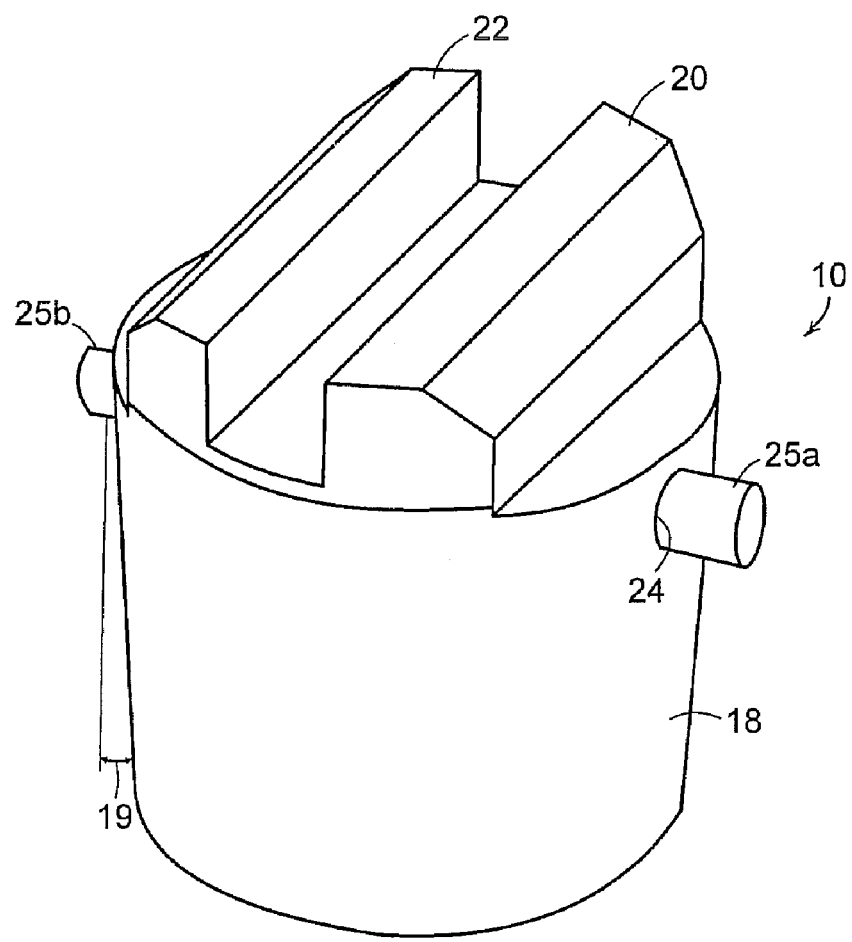
FIG. 5 shows an illustrative isometric view of a mirror mounting structure for use in a limited rotation motor system in accordance with an embodiment of the invention.

As shown in FIGS. 1 and 2, a mirror mounting structure 10 in accordance with an embodiment of the invention includes a transverse slot into which a mirror may be cemented, soldered or otherwise fastened, and a tapered base 18 that may be received within a tapered opening 16 in a rotor output shaft 14. The transverse slot is formed by slot elements 20 and 22 as shown in FIG. 2. The mirror mounting structure 10 retains the simplicity of having a transverse slot in the shaft, but is replaceable, attaches securely yet adds little or no inertia to the system, supports the mirror in proportion to its size, and allows a high degree of accuracy in geometrical mirror alignment. The mirror mounting structure 10 is also shown on an enlarged scale in FIG. 5. As shown in FIG. 5, the base 18 includes a taper angle as indicated at 19. The structure 10 may also include a small hole 24 on one or both sides through which one or two rotation stops 25*a*, 25*b* may be placed in certain embodiments. The rotation stops 25*a* and 25*b* may be formed by two ends of a single pin that passes through the structure 10, or may be formed as two separate stops. The taper may be linear as shown in FIG. 5, or in further embodiments the taper may be non-linear. The use of a tapered mirror mount may provide improvement in efficiency of about 25 percent to about 35 percent.

Figure 4:
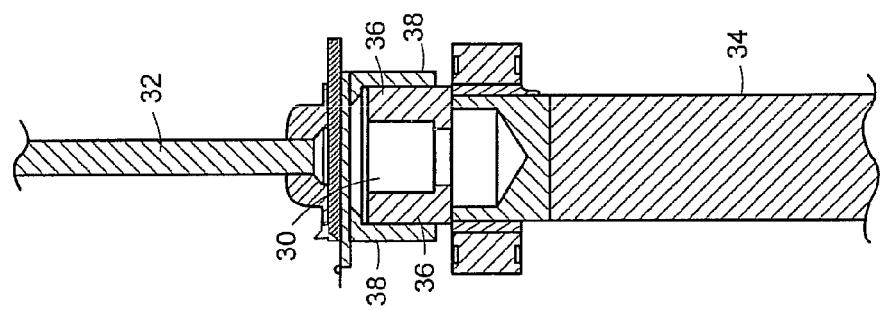
FIG. 4 shows a portion of a side sectional view similar to that shown in FIG. 3 of a mirror and rotor assembly for use in a limited rotation motor system in accordance with a further embodiment of the invention.

As shown in FIG. 4, in accordance with another embodiment of the invention, a mirror mounting structure 30 may include a tapered opening in its base 38 that receives a tapered end 36 of a rotor output shaft 34. The structure 30 also includes a transverse slot into which a mirror 32 is cemented, soldered or otherwise secured. In each embodiment, the mirror end of the coupling unit is of a diameter, and therefore the length of the sides of the slot supporting the mirror are of a length, proportionate to the supporting rigidity, required for that particular mirror size and design. The mirror end of the coupling unit may be modified from a cylindrical form into an ellipse or other shape as required to provide a desired length of support for the mirror. The depth of the slot may also be adjusted as appropriate. The unit is tapered on the exterior at an angle, and has such a length, that it is self-locking against the motor maximum torque in the most general embodiment.

Different applications may require different degrees of locking. For example, it might be desired that the direction perpendicular to the face of the mirror be hand-re-adjustable with respect to the angular position of the shaft during assembly and alignment of the optical system of which it is a part. This application would result in a relatively large taper angle. On the other hand, it might be that the optical system of which it is a part must withstand large accelerations, such as those during launch of a space vehicle. This application would require a relatively small taper angle.

The angle of taper and length of engagement are chosen over a range of angles and lengths as a compromise between the need for a self-locking fit, and the desire for easy release when required. The general range of useful angles for locking is between 0.03 and 0.07 inches per inch. Tapers at the smaller-taper end of the range tend to grip very tightly, and at the upper end to release easily. It is also within the scope of the invention to design the taper angle and engagement length so that the tapers lock so tightly as to become essentially permanently affixed, and, conversely, to release so easily that they must be bonded together to transmit meaningful torque.

In order to maximize the stiffness and minimize the inertia of the assembly, the plug and recess preferably occupy volume inside the bearing that supports the output. It is, however, within the scope of the invention that the unit and it's mating shaft portion be positioned anywhere along the shaft axis.

Figure 3:
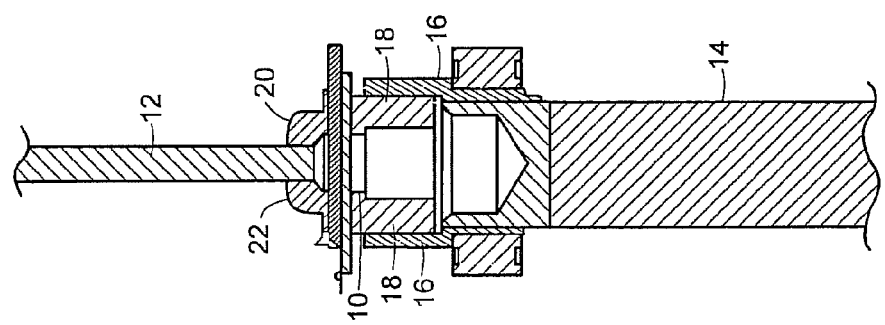
FIG. 3 shows a portion of the illustrative diagrammatic side section view of FIG. 2 on an enlarged scale.

The end of the shaft or post is equipped with a concentric hollow recess in the embodiment of FIG. 3 in the form of a mating taper, so that when the base 18 in the form of a male plug is inserted into the recess and forced together into position, the tapers lock. Such a joint has optimum performance in terms of concentricity, lack of tilt, torque transmission, and freedom from a tendency to loosen in use. When it is desired to remove the mount, a plier-like tool may be clamped to the flats on the plug, and an axial tensile force of a few pounds, depending on the size of the mount and the design of the taper, is applied between the plier and the inner ring of the front bearing, in the case of a motor, or galvanometer, or a suitable flange in the case of a mounting post (not shown), thus releasing the taper without damage.

Figure 6:
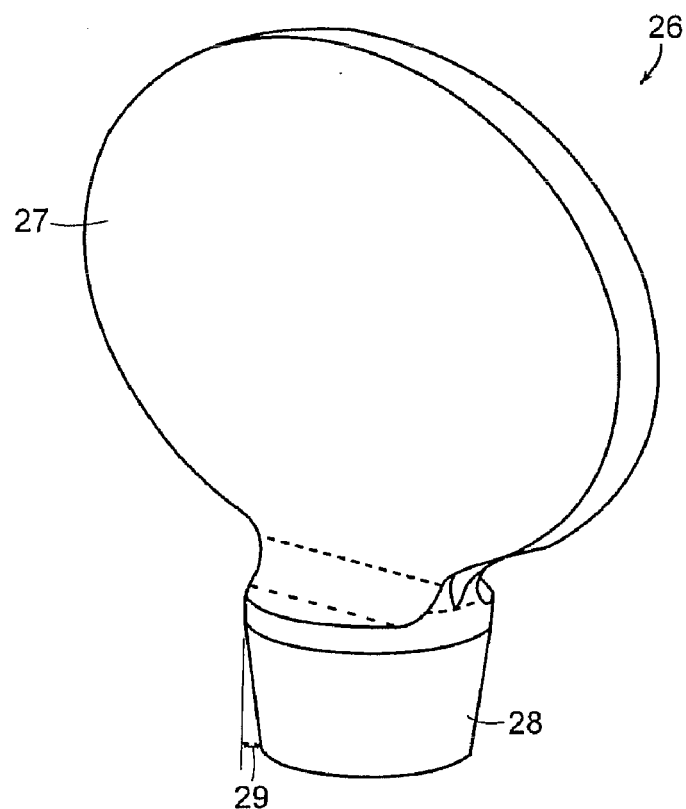
FIG. 6 shows an illustrative isometric view of a unitary mounting structure and mirror for use in a limited rotation motor system in accordance with another embodiment of the invention.

As shown in FIG. 6, a system in accordance with another embodiment of the invention may include a unitary mirror and mounting unit 26 with a polished surface 27 (that provides a mirror) and a base 28 having a taper as indicated at 29.

Figure 7:
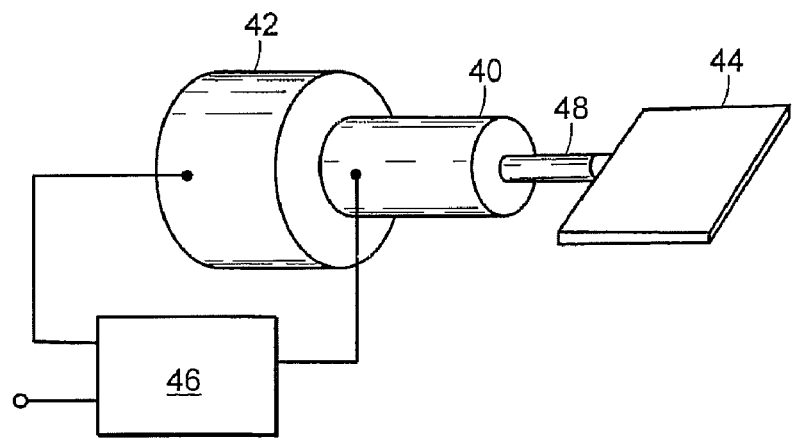
FIG. 7 shows an illustrative diagrammatic isometric view of a limited rotation motor system in accordance with an embodiment of the invention.

As shown in FIG. 7, a scanner assembly including a rotor shaft and mirror mounting structure in accordance with an embodiment of the invention may include a scanner motor 40, having a rotatable rotor with an outer shaft 48 as discussed above, with transducer 42 for monitoring the position of the shaft attached to one end of the rotor and a scanning element 44, which may comprise a mirror, attached to the output shaft of the scanner motor 40 at an opposite end from the position transducer. Of course, the scanning element 44 and the position transducer 42 may each be attached to the rotor at the same end thereof. The system also includes a feedback control system 46 that is coupled to the transducer 42 and the motor 40 as shown to control the speed and/or position of the motor.

Figure 8:
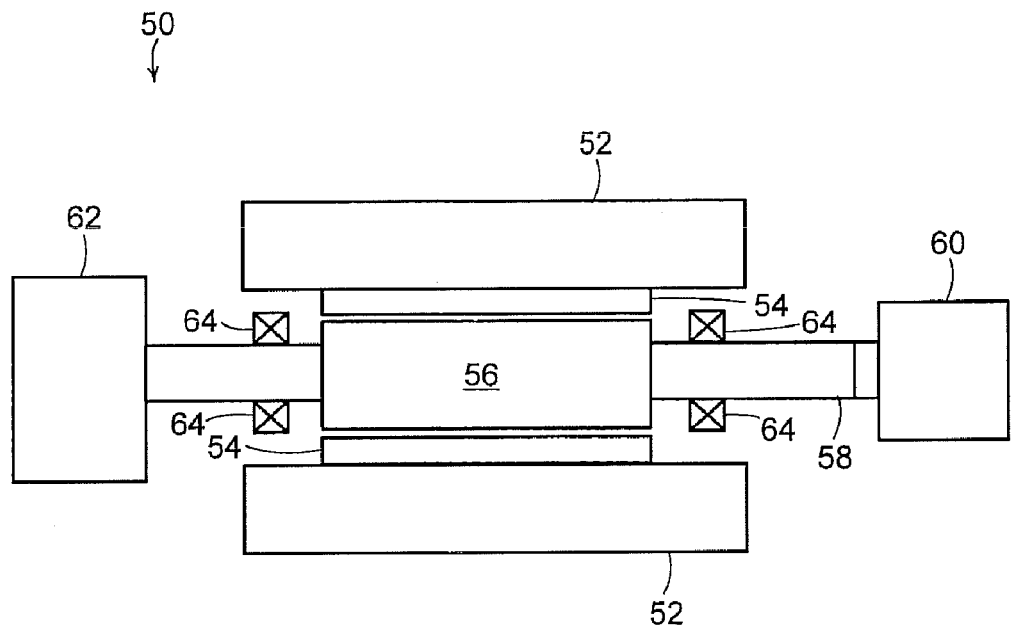
FIGS. 8 and 9 show illustrative diagrammatic side sectional views of further limited rotation motor systems of further embodiments of the invention.

As shown in FIG. 8, a mirror mounting structure in accordance with an embodiment of the invention may be used with in a system 50 that includes a backiron 52, stator coils 54 and a magnet 56 that is secured to a shaft 58. The shaft 58 is rotatably mounted to a housing structure (not shown) via bearings 64. A scanner element such as a mirror 60 is mounted to one end of the shaft 58 while a position transducer 62 is mounted to the other end of the shaft 58.

Figure 9:
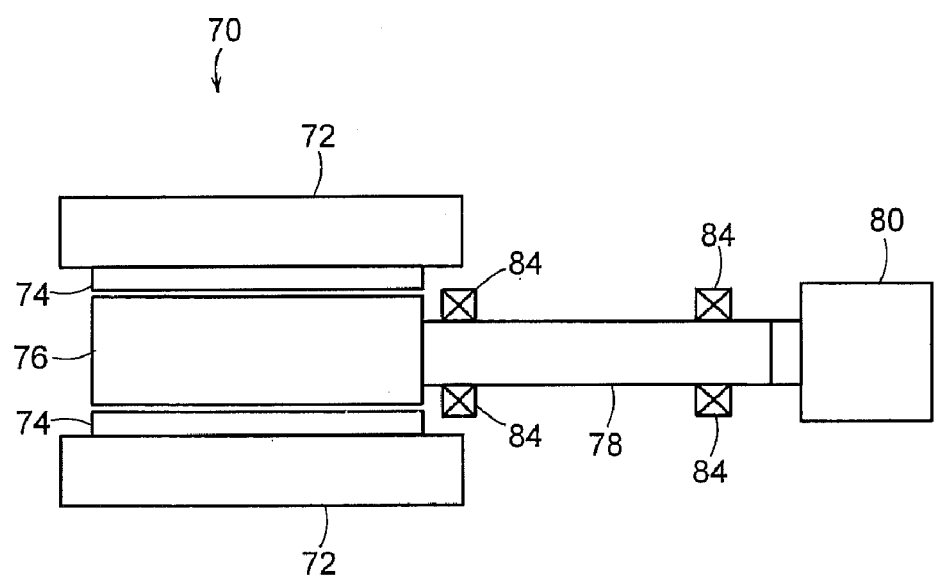

As shown in FIG. 9, a limited rotation torque motor assembly 70 in accordance with a further embodiment of the invention may include a backiron 72, stator coils 74 and a magnet 76 that is secured to a shaft 78 as discussed above. A mirror 80 is attached to the shaft via a mirror mounting structure of the invention and the shaft is rotatably secured to a housing structure (not shown) via bearings 84. The assembly 70 may further include a position transducer as discussed above.

For example, such limited rotation motors may be used in a laser drilling system for producing vias (or holes) in printed circuit boards (PCBs). The system may include a pair of galvanometer based X-Y scanners as well as an X-Y stage for transporting the PCB, and a scan lens that provides for parallel processing of circuit board regions within the field covered by the scanners and lens. The X-Y stage transports the circuit board along rows and columns needed for entire coverage. The circuit board is typically substantially larger than the scan field.

Such limited rotation motors may also be used in multi-layer drilling systems in accordance with another embodiment of the invention. The operations may include hole punching (or percussion drilling) where one or more laser pulses form a single hole within an effective spot diameter without relative movement of the beam with respect to object, or may include trepanning (which does involve relative movement between the beam and the object during the drilling operation). During trepanning, a hole having a diameter substantially larger than a spot diameter is formed. A substrate is laser drilled from a top surface of the substrate to an exposed bottom surface of the substrate using a plurality of laser pulses that are preferably trepanned in a circle, but other trepanning patterns, such as ovals and squares, may be used. For example, a trepanning pattern of movement of the laser focal spot is one in which the beam spot starts in the center of the desired via, and gradually spirals outwardly to an outer diameter of the via. At that point the beam is caused to orbit around the via center for as many revolutions as is determined necessary for the particular via. Upon completion, the focal spot is caused to spiral back to the center and thereafter awaits the next command. An example of a trepanning velocity is 3 millimeters per second. In such drilling applications, it is sometimes advantageous to provide rapid point to point positioning of the beam with a rapid settling time irrespective of the trajectory between the points.

The overall drilling system throughput can be affected by many factors such as the required number of holes within a field, hole size, stage speed, etc. System bandwidth improvements may be generally useful within a substrate drilling system, and such improvements may be particularly advantageous in substrate drilling systems wherein trepanning or similar motion is used for hole formation. Limited rotation motors discussed above may also be employed for drilling other substrates such as electronic packages, semiconductor substrates, and similar workpieces.

Such limited rotation motors may also be employed in substrate marking employing lasers, or laser marking, of for example, semiconductors, wafers and the like on either front or backsides of the substrates. The marks produced by the laser (such as a diode pumped solid state laser), whether on a front or back side, may be formed as a 1D or 2D matrix, and in compliance with various industry standards. The performance of such a system may depend, at least in part, on marking speed, density, and quality, and improvements in limited rotation motor performance may improve marking speed, density and quality. Marking speed over a field, as measured in mm/sec for example, is a function of the laser repetition rate, spot size, and the speeds of the one or motors (e.g., low and fast scan direction motors) used in the system.

In accordance with further embodiments, systems of the invention may be provided for other high speed marking applications in the electronic industry such as, for example, marking of packages or devices in trays, or other similar workpieces.

Limited rotation motors as discussed above may also be employed in laser trimming systems in accordance with further embodiments of the invention. One or more embodiments of the present invention may be used in a laser trimming system, or in a substrate micromachining system. For example, such a system may provide a method for high-speed, precise micromachining an array of devices (such as resistors), which each of the devices having at least one measurable property (such as resistance). The method includes the steps of: a) selectively micromachining a device in the array to vary a value of a measurable property; b) suspending the step of selectively micromachining; c) while the step of selectively micromachining is suspended, selectively micromachining at least one other device in the array to vary a value of a measurable property; and d) resuming the suspended step of selectively micromachining to vary a measurable property of the device until its value is within a desired range. At least one of the steps of selectively micromachining may include the steps of generating and relatively positioning a laser beam to travel in a first scanning pattern across the devices, superimposing a second scanning pattern with the first scanning pattern and irradiating at least one device with at least one laser pulse.

A micromachining system in accordance with another embodiment of the invention may provide for a fast scan pattern to be carried out using with an acousto-optic deflector, superimposed on a second, lower speed scan pattern that is carried out using a limited rotation motor as discussed above. Generally, the access or retrace time of the acousto-optic deflector is on the order of tens of microseconds. In certain embodiments improved motor speed will directly result in improved trimming speed.

Those skilled in the art will appreciate that numerous modifications and variations may be made to the above disclosed embodiments without departing from the spirit and scope of the invention.

What is claimed is:

1. A mirror mounting unit for use in a limited rotation motor system, said mirror mounting unit comprising a mirror, and a tapered base for coupling the mirror mounting unit to an output shaft of a limited rotation motor, one of said tapered base and the output shaft including a cylindrical tapered male plug having a decreasing inner diameter that decreases along a direction of coupling of the tapered base and the output shaft for engaging the tapered base to the output shaft, said tapered base including a taper angle of at most about 4.0 degrees from the rotational axis of the output shaft.

2. The mirror mounting unit as claimed in claim 1, wherein said tapered base is a tapered male plug for engaging a female end of the output shaft.

3. The mirror mounting unit as claimed in claim 1, wherein said tapered base is a tapered female end for engaging a male end of the output shaft.

4. The mirror mounting unit as claimed in claim 1, wherein said tapered base includes a taper angle of between about 1.7 degrees from the rotational axis of the output shaft to about 4.0 degrees from the longitudinal axis of the output shaft.

5. The mirror mounting unit as claimed in claim 1, wherein said tapered base is formed of a material that is different than a material of the output shaft.

6. The mirror mounting unit as claimed in claim 1, wherein the mirror is cemented into a slotted opening in said mirror mounting unit.

7. The mirror mounting unit as claimed in claim 1, wherein a taper angle on the tapered base and an engagement length are selected such that an interface between the base and the output shaft forms a permanent lock.

8. The mirror mounting unit as claimed in claim 1, wherein a taper angle on the tapered base and an engagement length are selected such that an interface between the base and the output shaft forms a non-permanent engagement of the plug and the output shaft.

9. The mirror mounting unit as claimed in claim 1, wherein the tapered base is bonded to the output shaft.

10. The mirror mounting unit as claimed in claim 1, wherein said mirror mounting unit is formed of any of silicon carbide, titanium, and beryllium.

11. The mirror mounting unit as claimed in claim 1, wherein said mirror is coupled to said mirror mounting unit via a receiving means for receiving said mirror on said mounting unit.

12. The mirror mounting unit as claimed in claim 1, wherein said mirror is integrally formed with said mirror mounting unit as a unitary structure.

13. The mirror mounting unit as claimed in claim 1, wherein said tapered base includes a taper that is linear.

14. The mirror mounting unit as claimed in claim 1, wherein said output shaft is coupled to a limited rotation motor.

15. The mirror mounting unit as claimed in claim 14, wherein said limited rotation motor is coupled to a scanning system.

16. The mirror mounting unit as claimed in claim 1, wherein said mirror mounting unit is provided with a laser drilling system.

17. The mirror mounting unit as claimed in claim 1, wherein said mirror mounting unit is provided with a laser marking system.

18. The mirror mounting unit as claimed in claim 1, wherein said mirror mounting unit is provided with a substrate machining system.

19. The mirror mounting unit as claimed in claim 1, wherein said mirror mounting unit is provided with a laser trimming system.

20. The mirror mounting unit as claimed in claim 1, wherein said taper angle is about 1.7 degrees from the rotational axis of the output shaft such that the tapered base and shaft lock so tightly together as to become essentially permanently affixed.

21. The mirror mounting unit as claimed in claim 1, wherein said taper angle is about 4.0 degrees from the rotational axis of the output shaft such that the tapered base and shaft form a lock that may be easily released from one another.

22. A mirror mounting unit for use in a limited rotation motor system, said mirror mounting unit comprising receiving means for receiving a mirror, and a tapered base for coupling the mirror mounting unit to an output shaft of a limited rotation motor, said tapered base mating with a tapered end of the output shaft of the limited rotation motor over a taper length, one of said tapered base and the output shaft including a cylindrical tapered male plug having a decreasing inner diameter that decreases along a direction of coupling of the tapered base and the output shaft for engaging the tapered base to the output shaft such that no adhesive is required to maintain contact between said tapered base and the output shaft during operation of the limited rotation motor system.

23. The mirror mounting unit as claimed in claim 22, wherein said tapered base is a tapered male plug for engaging a female end of a the output shaft.

24. The mirror mounting unit as claimed in claim 22, wherein said tapered base is a tapered female end for engaging a male end of the output shaft.

25. The mirror mounting unit as claimed in claim 22, wherein said tapered base includes a taper angle of between about 1.7 degrees from the rotational axis of the output shaft to about 4.0 degrees from the longitudinal axis of the output shaft.

26. The mirror mounting unit as claimed in claim 22, wherein said tapered base is formed of a material that is different than a material of the output shaft.

27. The mirror mounting unit as claimed in claim 22, wherein the receiving means includes a slotted opening and the mirror is cemented into the slotted opening.

28. The mirror mounting unit as claimed in claim 22, wherein a taper angle on the tapered base and an engagement length are selected such that an interface between the base and the output shaft forms a permanent lock.

29. The mirror mounting unit as claimed in claim 22, wherein a taper angle on the tapered base and an engagement length are selected such that an interface between the base and the output shaft forms a non-permanent engagement of the plug and the output shaft.

30. The mirror mounting unit as claimed in claim 22, wherein the tapered base is bonded to the output shaft.

31. The mirror mounting unit as claimed in claim 22, wherein said mirror mounting unit is formed of any of silicon carbide, titanium, and beryllium.

32. The mirror mounting unit as claimed in claim 22, wherein said tapered base includes a taper that is linear.

33. A mirror mounting unit for use in a limited rotation motor system, said mirror mounting unit comprising receiving means for receiving a mirror, and a tapered base for coupling the mirror mounting unit to an output shaft of a limited rotation motor, said tapered base mating with a tapered end of the output shaft of the limited rotation motor over a taper length, one of said tapered base and the output shaft including a cylindrical tapered male plug having a decreasing inner diameter that decreases along a direction of coupling of the tapered base and the output shaft for engaging the tapered base to the output shaft such that no adhesive is required to maintain contact between said tapered base and the output shaft during assembly, yet re-adjustment of the angular position of the shaft during assembly and alignment of mirror mounting unit is permitted.

* * * * *